United States Patent
Abelha Ferreira et al.

(10) Patent No.: US 11,455,556 B2
(45) Date of Patent: Sep. 27, 2022

(54) FRAMEWORK FOR MEASURING TELEMETRY DATA VARIABILITY FOR CONFIDENCE EVALUATION OF A MACHINE LEARNING ESTIMATOR

(71) Applicant: EMC IP Holding Company LLC, Hopkinton, MA (US)

(72) Inventors: Paulo Abelha Ferreira, Rio de Janeiro (BR); Adriana Bechara Prado, Niterói (BR); Pablo Nascimento da Silva, Niterói (BR)

(73) Assignee: EMC IP Holding Company LLC, Hopkinton, MA (US)

( * ) Notice: Subject to any disclaimer, the term of this patent is extended or adjusted under 35 U.S.C. 154(b) by 345 days.

(21) Appl. No.: 16/859,788

(22) Filed: Apr. 27, 2020

(65) Prior Publication Data
US 2021/0334678 A1    Oct. 28, 2021

(51) Int. Cl.
*G06N 5/04* (2006.01)
*G06N 20/00* (2019.01)

(52) U.S. Cl.
CPC ............... *G06N 5/04* (2013.01); *G06N 20/00* (2019.01)

(58) Field of Classification Search
CPC ....................................................... G06N 5/04
See application file for complete search history.

(56) References Cited

PUBLICATIONS

Alison L. Gibbs and Francis Edward Su; "On Choosing and Bounding Probability Metrics"; International Statistical Review; vol. 70, No. 3; Sep. 3, 2002; arXiv:math/0209021v1 [math.PR].

*Primary Examiner* — Brian Whipple
(74) *Attorney, Agent, or Firm* — Chamberlain, Hrdlicka, White, Williams & Aughtry

(57) ABSTRACT

A deployment manager includes storage for storing a prediction model based on telemetry data from the deployments and a prediction manager. The prediction manager generates, using the prediction model and second telemetry data obtained from a deployment of the deployments: a prediction, and a prediction error estimate; in response to a determination that the prediction indicates a negative impact on the deployment: generates a confidence estimation for the prediction based on a variability of the second telemetry data from the telemetry data; in response to a second determination that the confidence estimation indicates that the prediction error estimate is inaccurate: remediates the prediction based on the variability to obtain an updated prediction; and performs an action set, based on the updated prediction, to reduce an impact of the negative impact on the deployment.

20 Claims, 9 Drawing Sheets

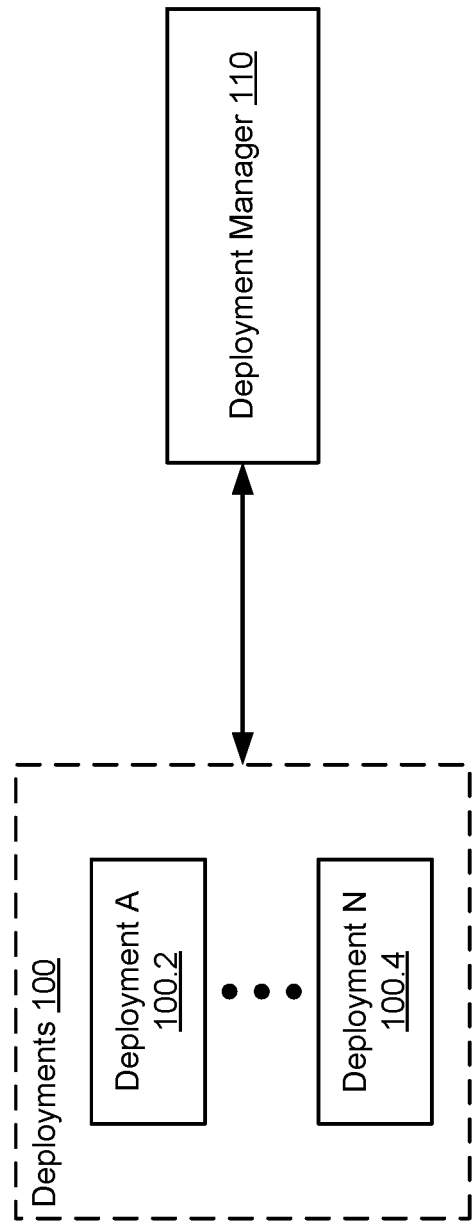
FIG. 1.1

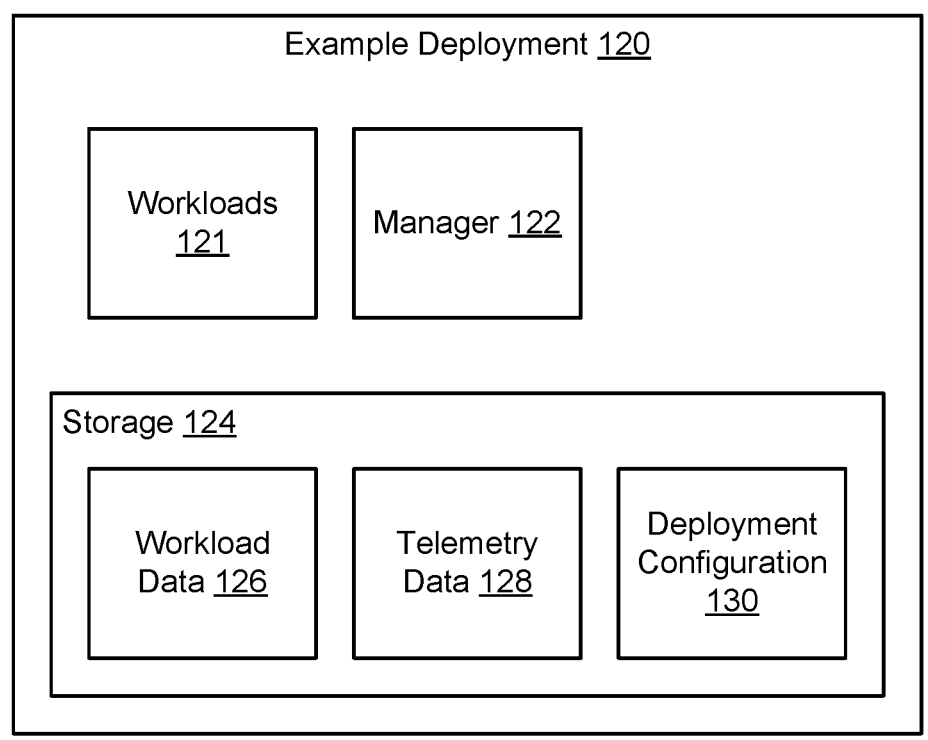
FIG. 1.2

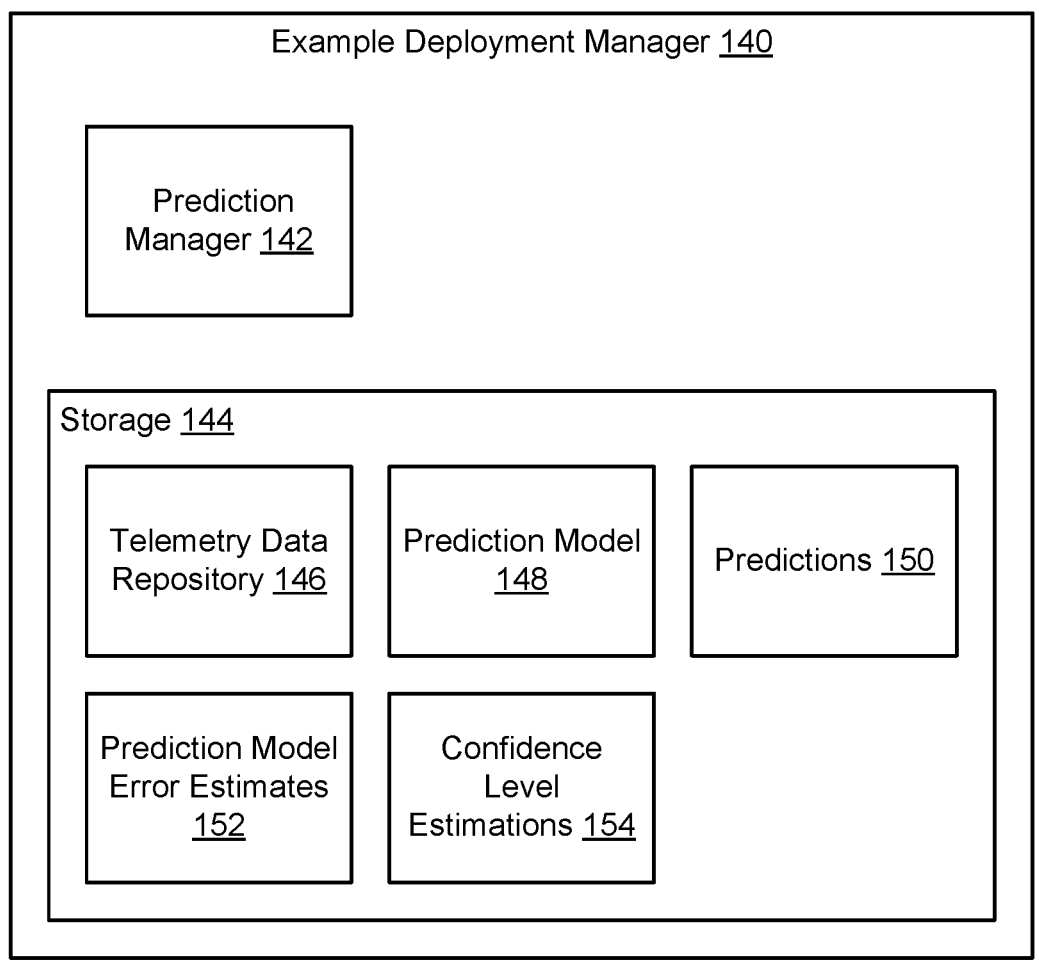
FIG. 1.3

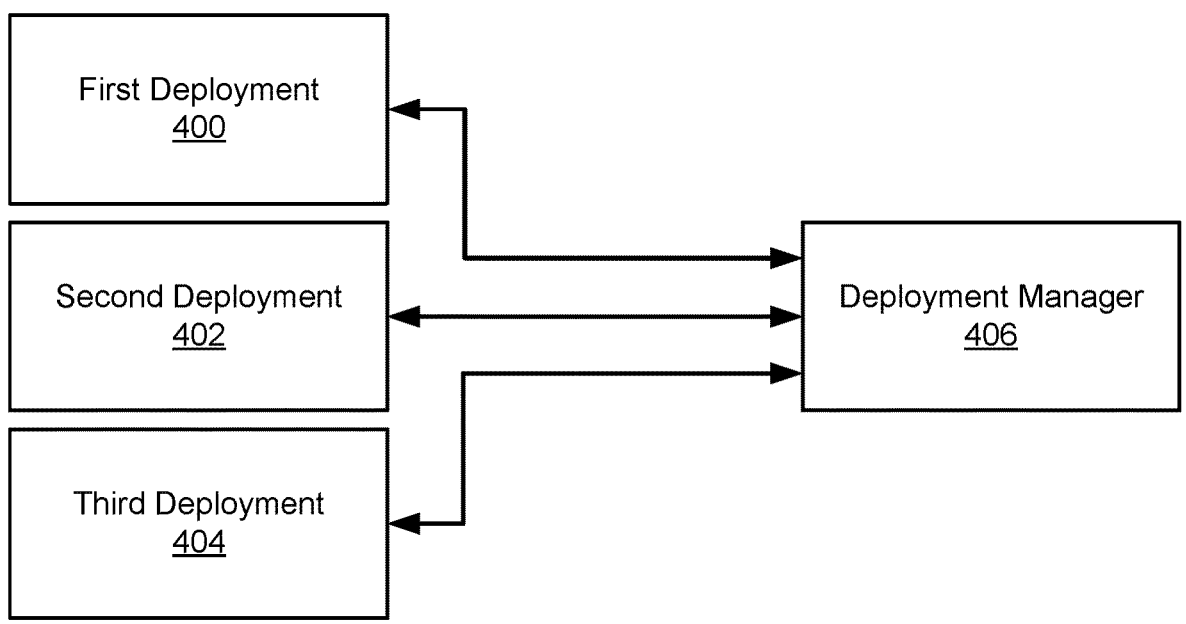
FIG. 4.1

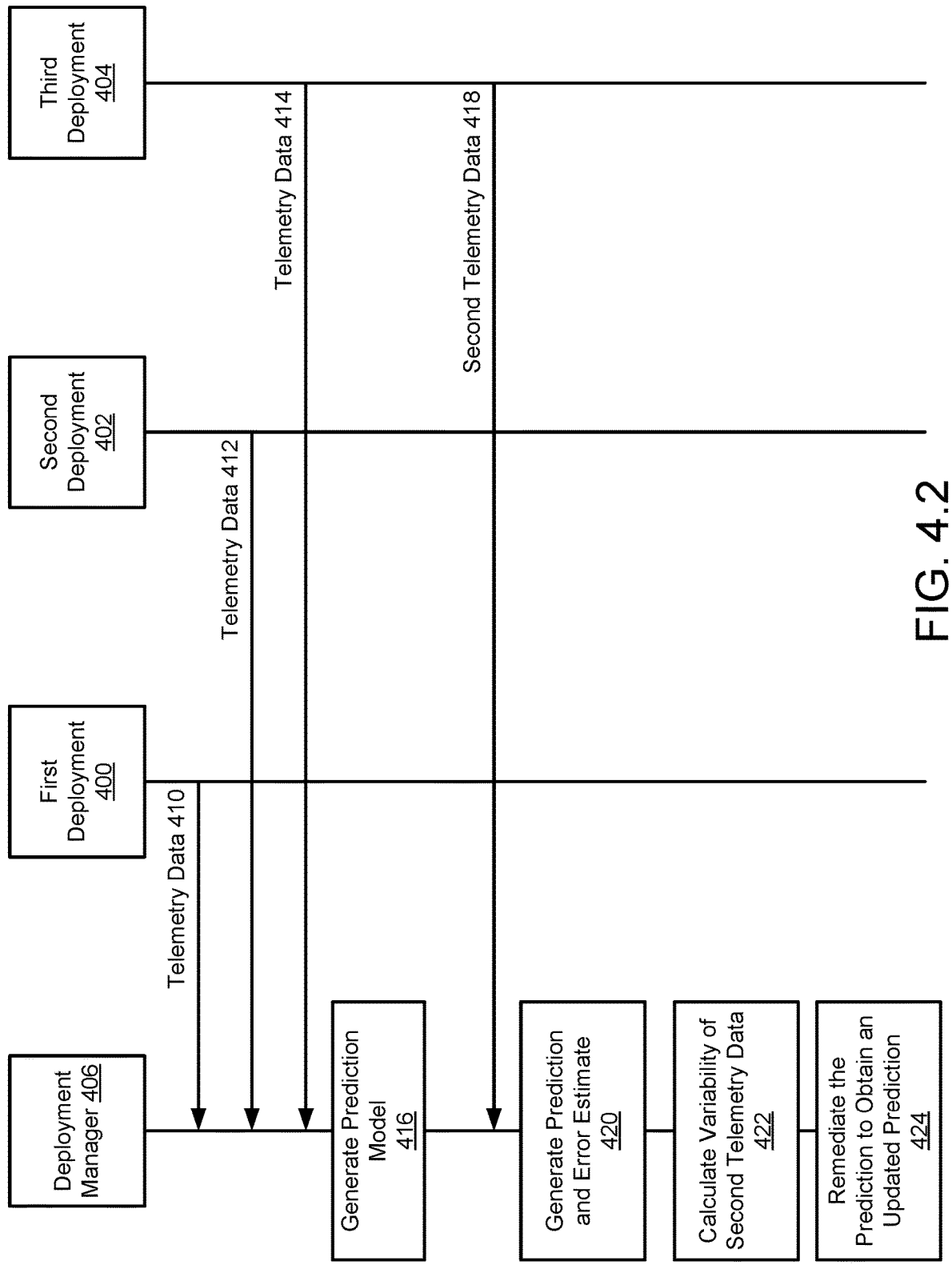
FIG. 4.2

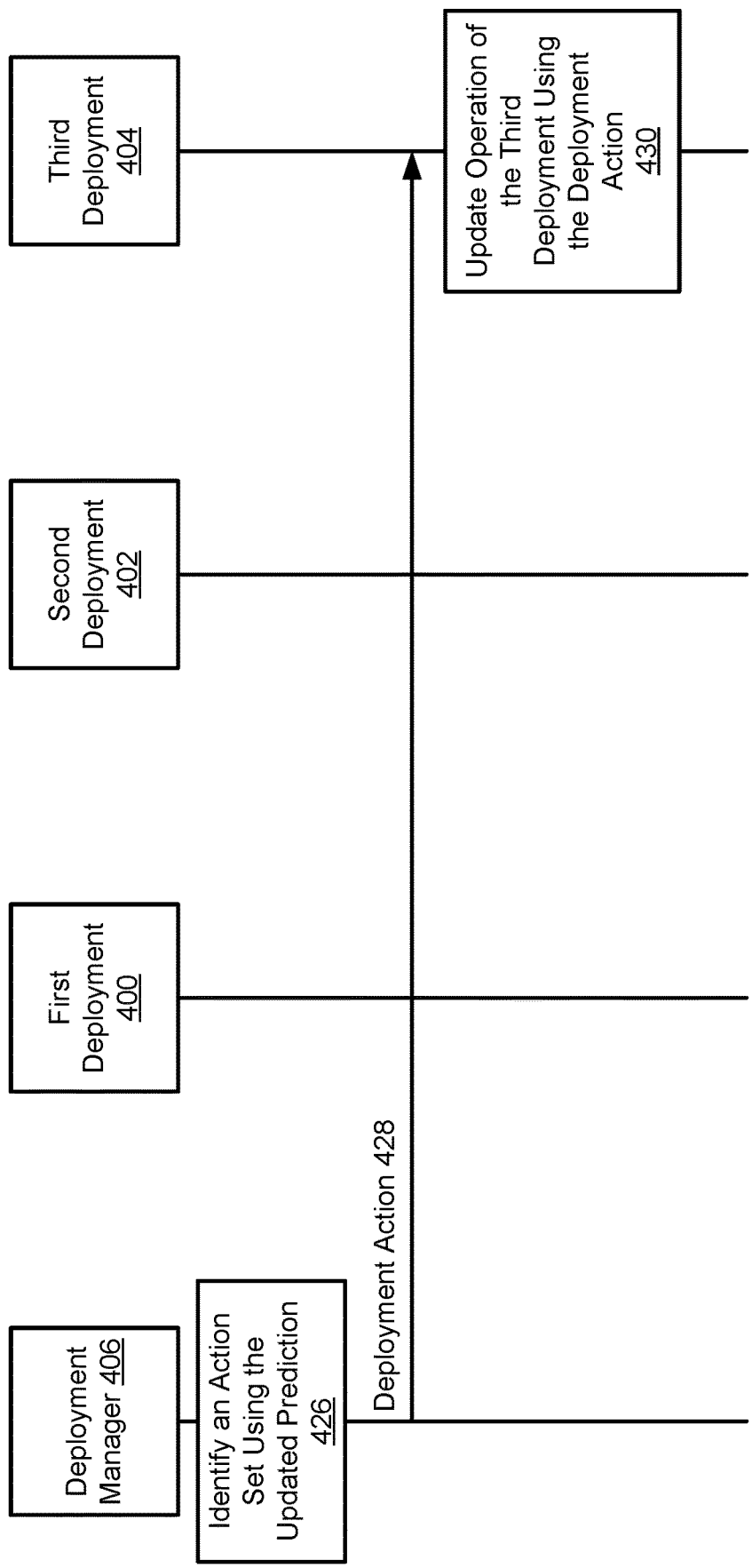
FIG. 4.3

FRAMEWORK FOR MEASURING TELEMETRY DATA VARIABILITY FOR CONFIDENCE EVALUATION OF A MACHINE LEARNING ESTIMATOR

BACKGROUND

Multiple computing devices may cooperate to provide computer implemented services. The ability of the computing devices to provide the computer implemented services may be limited by the computational resources available to the computing devices.

SUMMARY

In one aspect, a deployment manager in accordance with one or more embodiments of the invention includes storage for storing a prediction model based on telemetry data from the deployments and a prediction manager. The prediction manager generates, using the prediction model and second telemetry data obtained from a deployment of the deployments: a prediction, and a prediction error estimate; in response to a determination that the prediction indicates a negative impact on the deployment: generates a confidence estimation for the prediction based on a variability of the second telemetry data from the telemetry data; in response to a second determination that the confidence estimation indicates that the prediction error estimate is inaccurate: remediates the prediction based on the variability to obtain an updated prediction; and performs an action set, based on the updated prediction, to reduce an impact of the negative impact on the deployment.

In one aspect, a method for generating predictions using a prediction model based on telemetry data from deployments in accordance with one or more embodiments of the invention includes generating, using the prediction model and second telemetry data obtained from a deployment of the deployments: a prediction, and a prediction error estimate; in response to a determination that the prediction indicates a negative impact on the deployment: generating a confidence estimation for the prediction based on a variability of the second telemetry data from the telemetry data; in response to a second determination that the confidence estimation indicates that the prediction error estimate is inaccurate: remediating the prediction based on the variability to obtain an updated prediction; and performing an action set, based on the updated prediction, to reduce an impact of the negative impact on the deployment.

In one aspect, a non-transitory computer readable medium in accordance with one or more embodiments of the invention includes computer readable program code, which when executed by a computer processor enables the computer processor to perform a method for generating predictions using a prediction model based on telemetry data from deployments. The method includes generating, using the prediction model and second telemetry data obtained from a deployment of the deployments: a prediction, and a prediction error estimate; in response to a determination that the prediction indicates a negative impact on the deployment: generating a confidence estimation for the prediction based on a variability of the second telemetry data from the telemetry data; in response to a second determination that the confidence estimation indicates that the prediction error estimate is inaccurate: remediating the prediction based on the variability to obtain an updated prediction; and performing an action set, based on the updated prediction, to reduce an impact of the negative impact on the deployment.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1.1 shows a diagram of a system in accordance with one or more embodiments of the invention.

FIG. 1.2 shows a diagram of a deployment in accordance with one or more embodiments of the invention.

FIG. 1.3 shows a diagram of a deployment manager in accordance with one or more embodiments of the invention.

FIG. 4.1 shows a diagram of a non-limiting example of a system in accordance with embodiments of the invention.

FIGS. 4.2-4.3 show diagrams of interactions between and actions performed by components of the example system of FIG. 4.1 over time.

DETAILED DESCRIPTION

Figure 2:
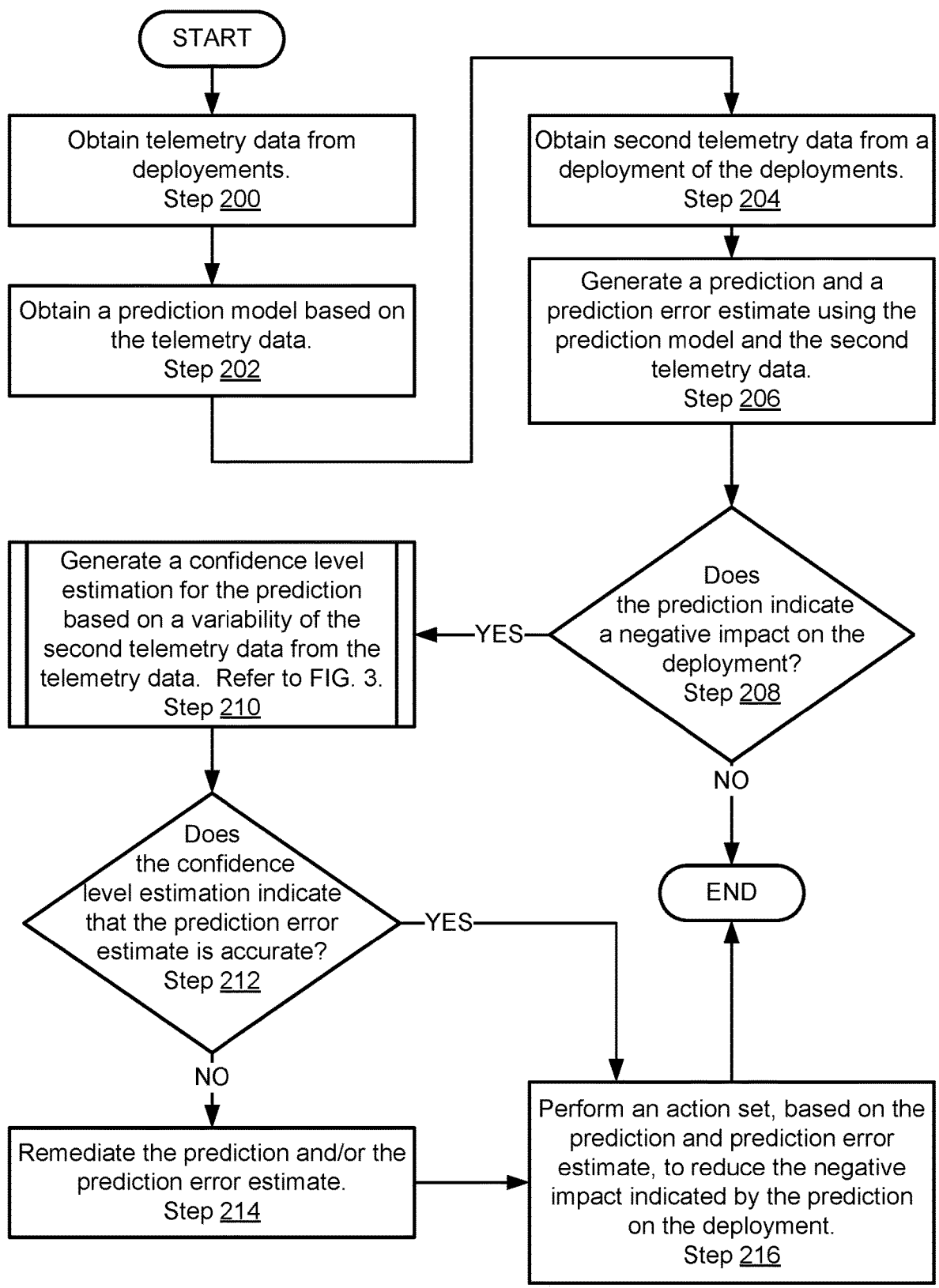
FIG. 2 shows a flowchart of a method of managing deployments in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for managing deployments. A deployment may be a collection of computing devices that may cooperatively provide one or more services. Each of the computing devices may have a limited quantity of computing resources for providing their respective services.

If a computing device provides a poor quality of service, users of the services may be negatively impacted. For example, users of the service may experience phantom slow downs or other nebulous behavior that does not appear to be rationally related to the user of the service by the user.

Embodiments of the invention may provide a system that provides good quality of services to users. To do so, the system may generate predictions regarding the future operation of deployments. These predictions may be used to modify the operation of the deployments to avoid providing poor quality services.

However, the predictions may be subject to error. For example, to generate predictions, a prediction model may be trained used historical operation of the deployments to predict the future operation of the deployments. The quality of the predictions may be limited based on the quantity of information used to train the prediction model. The accuracy of the prediction model may be limited to the domain of the information used to train the model. In other words, the model may generate inaccurate predictions for deployments whose operation diverges from that used to train the prediction model.

To make better deployment management system, the system may also obtain prediction error estimates from the prediction model. The prediction error estimate may indicate the relative accuracy of predictions generated by the prediction model. However, like the predictions, the prediction error estimate may be subject to error based on the limited domain of the data used to train the prediction model.

To further improve the quality of deployment management decisions, the system may ascertain whether the prediction error estimates are accurate. To make the determination, the system may determine whether the telemetry data from a deployment used as input to the prediction model has a variability from the telemetry data used to train the prediction model that is correlated with the prediction error estimates. The level of correlation (e.g., a confidence level estimate with respect to the prediction error estimates) between the variability and the prediction error estimates may be used to determined whether the prediction error estimates are accurate.

The system may use the prediction, the prediction error estimate, and the confidence level estimate in the prediction error estimate to make management decisions with respect to a deployment. The system may take into account likely inaccuracy in the prediction error estimates when making deployment management decisions. By doing so, the system may make deployment management decisions that are likely to improve the quality of computing services provided by deployments.

FIG. 1.1 shows an example system in accordance with one or more embodiments of the invention. The system may include deployments (100) that provide computer implemented services. The computer implemented services provided by each of the deployments (e.g., 100.2, 100.4) may be similar to and/or different from computer implemented services provided by other deployments. Each deployment may provide any type and quantity of computer implemented services.

The ability of the deployments (100) to provide their respective computer implemented services may depend on the type and quantity of computing resources available to the deployments (100). For example, some computer implemented services may rely on storing data in persistent storage. In such cases, the quality of the computer implemented services available to the deployments may depend on the capabilities (e.g., available storage, rate to store data, rate to provide previously stored data, etc.) of the persistent storage.

Additionally, overtime the use of computing resources for providing any type of computer implemented service (e.g., workloads being performed by the deployments) may change thereby resulting in changes in the quality of the computer implemented services provided by the respective deployments. For example, applications (which may provide all, or a portion, of the computer implemented services) may encounter a change in use by users of a computer implemented service which, in turn, changes the manner in which the applications that provide the computer implemented service utilize computing resources of the deployments.

Additionally, the quality of computer implemented services available for use by applications hosted by the deployments (100) may change over time to changes in use of the computing resources by other applications. For example, consider a scenario in which a little used database hosted by a deployment begins to see large amounts of use by users. In such a scenario, the computing resources available to other entities hosted by the deployment may change in character. The access time for persistent storage may increase because the newly busy database may monopolize or otherwise heavily use the persistent storage.

Further, the quality of computer implemented services available for use by applications hosted by the deployments (100) may change over time due to changes in the components providing the computer implemented services. For example, as hard disk drives become filled with data, the seek time, read time, and/or write (in addition to other characteristics of the computing resources provided by the hard disk drives) may change thereby changing the quality of storage computing resources available to applications hosted by the deployments.

Due to these changes in the availability of computing resources overtime, the corresponding quality of computer implemented services provided by deployments may change. In some cases, the change in quality of the computing resources may negatively impact the provided computing resources. For example, if storage access times increase in duration, the ability to provide storage access dependent computer implemented services may be negatively impacted. The results may be, for example, phantom slowdowns, as observed by users of the computer implemented services, that may frustrate users of the computer implemented services.

To improve the quality of computer implemented services provided by deployments (100) and/or provide other benefits, embodiments of the invention may provide a system and method for managing the deployments to avoid negative impacts of changes in computer implemented services. To avoid such negative impacts, the system may generate predictions of (i) the quality of computing resources of the deployments over time, (ii) the quality of computer implemented services provided by the deployments over time, and/or (iii) other aspects of the operation of the deployments that may be useful for any number of purposes.

To provide the aforementioned predictions to manage the deployments (100), the system may include a deployment manager (110). The deployment manager (110) may (i) obtain information regarding the operation of the deployments, (ii) generate predictions based on the deployments, (iii) estimate the error present in the predictions, (iv) estimate a confidence level with respect to the error estimate, and (v) manage the deployments (e.g., modify their operation, notify administrators of potential issues, etc.) based on the predictions, error estimates of the predictions, and confidence level estimates of the error estimates.

By doing so, a system in accordance with embodiments of the invention may better manage the operation of the deployments (100) by improving the accuracy of predictions and/or use of the predictions. For example, the system may, upon learning that a prediction may be in error, evaluate the confidence in the error estimate. By doing so, the system may avoid taking action based on error estimates that may, themselves, be in error. Consequently, the management decisions made by the system may be more likely to avoid future decreases in the quality of computer implemented services.

The components of the system illustrated in FIG. 1.1 may be operably connected to each other and/or operably connected to other entities (not shown) via any combination of wired and/or wireless networks. Each component of the system illustrated in FIG. 1.1 is discussed below.

The deployments (100) may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described in this application and/or all, or a portion, of the methods illustrated in FIGS. 2-3. The deployments (100) may be implemented using other types of computing devices without departing from the invention. For additional details regarding computing devices, refer to FIG. 5.

The deployments (100) may be implemented using logical devices without departing from the invention. For example, the deployments (100) may be implemented using virtual machines that utilize computing resources of any number of physical computing devices to provide the functionality of the deployments (100). The deployments (100) may be implemented using other types of logical devices without departing from the invention.

In one or more embodiments of the invention, the deployments (100) provide computer implemented services. For example, the deployments (100) may provide database services, electronic communication services, file storage services, or any other types of computer implemented services. Each of the deployments (100) may provide any number of types and/or quantities of computer implemented services. Different deployments may provide similar and/or different computer implemented services. The system of FIG. 1.1 may include any number of deployments.

To facilitate improvement of the quality of computer implemented services provided by the deployments, the deployments (100) may cooperate with the deployment manager (110) to generate predictions, error estimations of the predictions, and/or confidence levels in the error estimations. To do so, the deployments (100) may (i) obtain data for use in prediction model generation, (ii) provide data for use in predictions, error estimation of the predictions, and confidence level estimation in the error estimates, (iii) obtain actions to be performed to avoid potential negative impacts included in predictions, and/or (iv) perform the obtained actions. For additional details regarding deployments, refer to FIG. 1.2.

The deployment manager (110) may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described in this application and/or all, or a portion, of the methods illustrated in FIGS. 2-3. The deployment manager (110) may be implemented using other types of computing devices without departing from the invention. For additional details regarding computing devices, refer to FIG. 5.

The deployment manager (110) may be implemented using logical devices without departing from the invention. For example, the deployment manager (110) may be implemented using virtual machines that utilize computing resources of any number of physical computing devices to provide the functionality of the deployment manager (110). The deployment manager (110) may be implemented using other types of logical devices without departing from the invention.

In one or more embodiments of the invention, the deployment manager (110) provides deployment management services. Deployment management services may include (i) obtaining data from multiple deployments to generate prediction models, (ii) generating predictions for the deployments using the prediction models, (iii) estimating the error in the predictions using the prediction models, (iv) estimating the confidence level in the error estimates using the data obtained from the multiple deployments, and/or (v) managing the deployments using the predictions, error estimates, and confidence level estimates. For additional details regarding deployment managers, refer to FIG. 1.3.

While the system of FIG. 1.1 has been described and illustrated as including a limited number of components for the sake of brevity, a system in accordance with embodiments of the invention may include additional, fewer, and/or different components than those illustrated in FIG. 1.1 without departing from the invention.

As discussed above, the deployments (100) may provide computer implemented services. FIG. 1.2 shows a diagram of an example deployment (120) in accordance with one or more embodiments of the invention. The example deployment (120) may be similar to any of the deployments (e.g., 100.2, 100.4) discussed with respect to FIG. 1.1. As discussed above, the example deployment (120) may provide computer implemented services and facilitate management of the example deployment (120) by a deployment manager.

To provide the aforementioned functionality of the example deployment (120), the example deployment (120) may include workloads (121), a manager (122), and storage (124). Each component of the example deployment (120) is discussed below.

In one or more embodiments of the invention, the workloads (121) are implemented using a hardware device including circuitry. The hardware device may be, for example, a digital signal processor, a field programmable gate array, or an application specific integrated circuit. The workloads (121) may be implemented using other types of hardware devices without departing from the invention.

In one or more embodiments of the invention, the workloads (121) are implemented using computing code stored on a persistent storage that when executed by a processor performs the functionality of the workloads (121). The processor may be a hardware processor including circuitry such as, for example, a central processing unit or a microcontroller. The processor may be implemented using other types of hardware devices for processing digital information without departing from the invention.

In one or more embodiments of the invention, the workloads (121) are tasks being performed by the example deployment (120) to provide computer implemented services. For example, the workloads (121) may be implemented as applications (e.g., computer code executable by a computing device) that provide the computer implemented services of the example deployment (120).

The workloads (121) may utilize, for example, a storage (124) of the example deployment (120). For example, the workloads (121) may store workload data (126) in the storage (124). To do so, the workloads (121) consume available computing resources (e.g., processing resources, memory resources, storage resources, communication resources, etc.). Thus, the quality of computer implemented services provided by the workloads (121) may be dependent on the quality of computing resources available to the workloads (121). Consequently, changes in the operation of the example deployment (120) may impact the quality of computer implemented services provided by the example deployment (120).

For example, changes in the operation of one or more of the hardware devices of the storage (124) may change the availability of storage resources. In another example, termination or suspension of one of the workloads (12) may change the availability of the storage resources.

To enable a deployment manager to manage changes in the operation of the example deployment (120) in a manner that improves the quality of computer implemented services provided by the example deployment (120), the example deployment (120) may include the manager (122).

In one or more embodiments of the invention, the manager (122) is implemented using a hardware device including circuitry. The hardware device may be, for example, a digital signal processor, a field programmable gate array, or an application specific integrated circuit. The manager (122) may be implemented using other types of hardware devices without departing from the invention.

In one or more embodiments of the invention, the manager (122) is implemented using computing code stored on a persistent storage that when executed by a processor performs the functionality of the manager (122). The processor may be a hardware processor including circuitry such as, for example, a central processing unit or a microcontroller. The processor may be implemented using other types of hardware devices for processing digital information without departing from the invention.

In one or more embodiments of the invention, the manager (122) provides deployment management support services. Deployment management support services may include (a) obtaining telemetry data (128) upon which predictions may be based, (b) providing the telemetry data (128) to other entities, (c) obtaining changes to the operation of the example deployment (120), and/or (d) implementing the obtained changes to the example deployment. By providing deployment management support services, the quality of computer implemented services provided by, for example, the workloads (121) hosted by the example deployment (120) may be improved by modifying its operation based on predictions generated by the deployment manager.

In one or more embodiments disclosed herein, the storage (124) is implemented using devices that provide data storage services (e.g., storing data and providing copies of previously stored data). The devices that provide data storage services may include hardware devices and/or logical devices. For example, storage (124) may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage (124) may include a memory device (e.g., a dual in line memory device) in which data is stored and from which copies of previously stored data are provided. In another example, storage (124) may include a persistent storage device (e.g., a solid-state disk drive) in which data is stored and from which copies of previously stored data is provided. In a still further example, storage (124) may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

The storage (124) may store data structures including workload data (126), telemetry data (128), and a deployment configuration (130). Each of these data structures is discussed below.

The workload data (126) may be one or more data structures that include information used by the workloads (121). For example, as the workloads (121) perform their functionality, they may store information in the workload data (126). The workloads (121) may use the workload data (126) in the future to provide their functionalities.

The telemetry data (128) may be one or more data structures that include information upon which predictions are generated. For example, the telemetry data (128) may include information regarding (i) the quality of computer implemented services (e.g., responsiveness, successful completion, etc.) provided by the example deployment (120) over time, (ii) use of computing resources (e.g., storage access patterns over time) of the example deployment (120) over time, (iii) the type and/or quality of computing resources of the example deployment (120) over time, and/or (iv) information regarding the configuration and/or other characteristics of the example deployment (120).

The deployment configuration (130) may be one or more data structures that include information regarding the configuration and/or other characteristics of the example deployment (120). For example, the deployment configuration (130) may include information regarding (i) the hardware components of the example deployment (120), (ii) the software hosted by the example deployment (120), (iii) the age, type and/or other types of biographical information regarding the example deployment (120), and/or (iv) other types of information that may be used to identify other deployments that are similar to the example deployment (120). All, or a portion, of the information included in the deployment configuration (130) may be included in the telemetry data (128). As will be discussed with respect to the methods illustrated in FIGS. 2-3, the telemetry data (128) may be provided to a deployment manager for prediction generation purposes.

While the data structures stored in storage (124) have been described as including a limited amount of specific information, any of the data structures stored in storage (124) may include additional, less, and/or different information without departing from the embodiments disclosed herein. Further, the aforementioned data structures may be combined (with each other and/or other data structures), subdivided into any number of data structures, may be stored in other locations (e.g., in a storage hosted by another device), and/or spanned across any number devices without departing from the embodiments disclosed herein.

While the example deployment (120) has been described and illustrated as including a limited number of components for the sake of brevity, a deployment in accordance with embodiments of the invention may include additional, fewer, and/or different components than those illustrated in FIG. 1.2 without departing from the invention.

As discussed above, the deployment manager (110, FIG. 1.1) may provide deployment management services. FIG. 1.3 shows a diagram of an example deployment manager (140) in accordance with one or more embodiments of the invention. The example deployment manager (140) may be similar to the deployment manager (110) discussed with respect to FIG. 1.1. As discussed above, the example deployment manager (140) may provide deployment management services by generating and utilize predictions regarding the operation of the deployments to manage the deployments.

To provide the aforementioned functionality of the example deployment manager (140), the example deployment manager (140) may include a prediction manager (142) and storage (144). Each component of the example deployment manager (140) is discussed below.

In one or more embodiments of the invention, the prediction manager (142) is implemented using a hardware device including circuitry. The hardware device may be, for example, a digital signal processor, a field programmable gate array, or an application specific integrated circuit. The prediction manager (142) may be implemented using other types of hardware devices without departing from the invention.

In one or more embodiments of the invention, the prediction manager (142) is implemented using computing code stored on a persistent storage that when executed by a processor performs the functionality of the prediction manager (142). The processor may be a hardware processor including circuitry such as, for example, a central processing unit or a microcontroller. The processor may be implemented using other types of hardware devices for processing digital information without departing from the invention.

In one or more embodiments of the invention, the prediction manager (142) provides deployment management services. Deployment management services may include (i) obtaining telemetry data from multiple deployment, (ii) generating prediction models using the telemetry data, (iii) obtaining second telemetry data from one of the deployments, (iv) generating, using the prediction model and the second telemetry data, a prediction and a prediction error estimation, (v) identifying a confidence level in the prediction error estimation, and (vi) managing the deployment using the prediction, prediction error estimate, and confidence level estimate.

By doing so, better decision regarding the management of deployments. Specifically, the prediction models generated using the telemetry data may not be entirely accurate. For example, the prediction models may be generated using a limited amount of training data. Due to the limited amount of available training data for generating the prediction models, the accuracy of the predictions may be suspect.

To address this potential error, the prediction models themselves may estimate their own error based on the limitations in the amount of data used to generate the prediction models. However, these error estimates themselves may be subject to error.

To address the error in the error estimates, the prediction manager (142) may generate confidence level estimates in the prediction errors based on the telemetry data upon which the prediction model is based (in contrast to the prediction model, itself). Specifically, the confidence level estimations may be made by identifying whether a deployment has characteristics in its telemetry data that it provided that vary from the characteristics in the telemetry data from other deployments.

Using the variability, the prediction manager (142) may ascertain whether the prediction error estimations are accurate. The prediction manager (142) may then take action to address the predictions based on whether the error estimations are accurate. Consequently, the prediction manager (142) may be more likely to make better deployment management decisions than if such decisions were only based on prediction and prediction error estimates rather than also basing the decisions on confidence levels of the prediction error estimates.

In one or more embodiments disclosed herein, the storage (144) is implemented using devices that provide data storage services (e.g., storing data and providing copies of previously stored data). The devices that provide data storage services may include hardware devices and/or logical devices. For example, storage (144) may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage (144) may include a memory device (e.g., a dual in line memory device) in which data is stored and from which copies of previously stored data are provided. In another example, storage (144) may include a persistent storage device (e.g., a solid-state disk drive) in which data is stored and from which copies of previously stored data is provided. In a still further example, storage (144) may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

The storage (144) may store data structures including a telemetry data repository (146), a prediction model (148), predictions (150), prediction model error estimates (152), and confidence level estimations (154). Each of these data structures is discussed below.

The telemetry data repository (146) may be one or more data structures that include that include any quantity of telemetry data obtained from any number of deployments. For example, the telemetry data repository (146) may include telemetry data from multiple deployments upon which the prediction model (148) is based and telemetry data from one of the deployments upon which the predictions (150) are based.

The prediction model (148) may be one or more data structures that include information used to generate predictions. For example, the prediction model (148) may take, as input, telemetry data from a deployment and generate a prediction regarding the deployment (e.g., a quality of computer implemented service that the deployment will provide in the future, a quality of computing resources available to the deployment in the future, etc.).

In one or more embodiments of the invention, the prediction model (148) is generated by training a machine learning model using telemetry data from any number of deployments. The telemetry data used for training the model may include (i) operating characteristics of the deployment during a first period of time and (ii) operating characteristics of the deployment during a second period of time, after the first period of time. In other words, a relationship between past performance to future performance.

The machine learning model may relate, for example, characteristics of a deployment during a first time period to its operating condition (e.g., a quality of computer implemented service that the deployment will provide in the future, a quality of computing resources available to the deployment in the future, etc.) in the future. The prediction model (148) may be implemented using other models for generating predictions without departing from the invention.

In one or more embodiments of the invention, the prediction model (148) provides, as part of its output, an estimation of the error included in its prediction. The error included in the prediction may, for example, be used by the prediction manager (142) to determine a particular set of actions to perform to avoid a negative impact on the a deployment as indicated by a corresponding prediction.

The predictions (150) may be one or more data structures that include information regarding predictions generated by the prediction model (148). The prediction may be used to select actions to be performed when managing the deployments. The actions may be selected by, for example, matching the predictions to corresponding actions. The associations between the predictions and the actions may be obtained using any method (e.g., heuristically identified).

The prediction model error estimates (152) may be one or more data structures that include information regarding error included in the predictions (150). The prediction model error estimates (152) may be used to select actions to be performed when managing the deployments. The actions may be selected by, for example, matching the prediction model error estimates (152) to corresponding actions. The associations between the prediction model error estimates and the actions may be obtained using any method (e.g., heuristically identified).

The confidence level estimations (154) may be one or more data structures that include information regarding error included in the prediction model error estimates (152). The confidence level estimations (154) may be used to select actions to be performed when managing the deployments. The actions may be selected by, for example, matching the confidence level estimations (154) to corresponding actions. The associations between the confidence level estimations and the actions may be obtained using any method (e.g., heuristically identified).

As discussed above, the prediction manager (142) may select actions to be performed to manage the deployments. The predictions (150), prediction model error estimates (152), and confidence level estimations (154) may form a tuple that uniquely, semi-uniquely, and/or non-uniquely identify one or more actions to be performed based on the aforementioned data structures. For example, the storage (144) may store a database (not shown) of associations between the tuples and corresponding actions. The actions included in the database may be identified via any method (e.g., heuristically, data mining, etc.) without departing from the invention.

While the data structures stored in storage (144) have been described as including a limited amount of specific information, any of the data structures stored in storage (144) may include additional, less, and/or different information without departing from the embodiments disclosed herein. Further, the aforementioned data structures may be combined (with each other and/or other data structures), subdivided into any number of data structures, may be stored in other locations (e.g., in a storage hosted by another device), and/or spanned across any number devices without departing from the embodiments disclosed herein.

While the example deployment manager (140) has been described and illustrated as including a limited number of components for the sake of brevity, a deployment manager in accordance with embodiments of the invention may include additional, fewer, and/or different components than those illustrated in FIG. 1.2 without departing from the invention.

Any of the data structures illustrated in FIGS. 1.2-1.3 may be implemented using, for example, lists, linked lists, tables, databases, and/or other types of data structures. Any of the data structures illustrated in FIGS. 1.2-1.3 may be maintained by the entities hosting the data structures. Maintaining a data structure may include, for example, obtaining information to be added to the data structures, removing stale information from the data structures, migrating the data structures between storage locations, and/or otherwise adding information to and/or removing information from the data structures to make the data structures more usable for their intended purposes. Any of the active components of FIGS. 1.2-1.3 may maintain the respective data structures without departing from the invention.

Returning to FIG. 1.1, the deployment manager may manage the deployments by predicting the future behavior of the deployments and ascertaining whether the predictions are sufficiently accurate to base management decisions on the predictions. FIG. 2 illustrates a method that may be performed by the deployment manager of FIG. 1.1 to manage the deployments.

FIG. 2 shows a flowchart of a method in accordance with one or more embodiments of the invention. The method depicted in FIG. 2 may be used to manage deployments using predictions, prediction error estimates, and confidence level estimates of the prediction error estimates in accordance with one or more embodiments of the invention. The method shown in FIG. 2 may be performed by, for example, a deployment manager (e.g., 110, FIG. 1.1). Other components of the system illustrated in FIG. 1.1 may perform all, or a portion, of the method of FIG. 2 without departing from the invention.

While FIG. 2 is illustrated as a series of steps, any of the steps may be omitted, performed in a different order, additional steps may be included, and/or any or all of the steps may be performed in a parallel and/or partially overlapping manner without departing from the invention.

In step 200, telemetry data from deployments is obtained. The telemetry data may be obtained by, for example, requesting the telemetry data from the deployments.

The telemetry data may include information regarding the past operation of the deployments, the subsequent operation of the deployments following their past operation, and/or information regarding characteristics of each of the deployments. The characteristics of the deployments may include, for example, the physical and/or logical components of the deployments, the age of the deployments, connectivity of the deployments, and/or any other types of information that may be used to ascertain whether a particular deployment is similar to the other deployments.

In response to receiving requests for the telemetry data, the deployments may provide the telemetry data. The telemetry data may be obtained via other methods of information passing between entities without departing from the invention. For example, the deployments may implement a publish/subscribe system in which the deployments may provide telemetry data without an explicit request from the deployment manager.

In step 202, a prediction model is obtained based on the telemetry data. The prediction model may be obtained using any predictive method without departing from the invention.

The prediction model may provide (i) predictions of the future behavior of deployments and (ii) prediction error estimates associated with the predictions. The prediction error estimates may specify the amount of error that may be included in any of the predictions.

However, the prediction error estimates themselves may include error. As discussed above and below, embodiments of the invention may provide a method of ascertaining whether the prediction error estimates are likely to be accurate using telemetry data. By ascertaining whether the prediction error estimates are accurate, the system may be able to make better decisions (e.g., using three pieces of data rather than two) regarding how to manage the deployments.

In one or more embodiments of the invention, the prediction model is obtained by training a machine learning model using a portion of the telemetry data associated with the operation of the deployments during a first time period and a second portion of the telemetry data associated with the operation of the deployments during a second period of time after the first period of time. The resulting machine learning model may be a data structure that relates telemetry data during a first period of time with a prediction of how a deployment will behave during a second period of time. Thus, the trained machine learning model may be capable of predicting the future behavior of the deployments based on their past behavior.

However, as noted above, both the predictions and the prediction error estimates for the predictions may both include some amount of error. For example, the quality of predictions of a trained machine learning model is highly dependent on the quality of the data used to train the machine learning model. For example, if too little training data is utilized, the predictions provided by the trained machine learning model may not be accurate over any domain of input that is not similar to the input used to train the model. Thus, if telemetry data from multiple deployments is used to train the machine learning model, the predictive capability of the machine learning model is likely inaccurate for deployments that have telemetry data that is dissimilar to that used to train the machine learning model.

In step 204, second telemetry data from a deployment of the deployments is obtained. The second telemetry data may be obtained in anticipate of generating a prediction of the future operating behavior of the deployment usable for managing the deployment. The second telemetry data may be obtained similar to that described with respect to step 200.

The second telemetry data may include, for example, information regarding the operating behavior of the deployment during a recent period of time. The second telemetry data may be used as a basis for a prediction.

In step 206, a prediction and a prediction error estimate are generated using the prediction model and the second telemetry data. In other words, the second telemetry data is used as input to the prediction model obtained in step 202. The output of the predictive model may be the prediction and the prediction error estimate.

In step 208, it is determined whether the prediction indicates a negative impact on the deployment.

The prediction may indicate a negative impact on the deployment if, for example, the quality of computer implemented services is predicted to be reduced during a future period of time, a predicted quantity of available computing resources during a future period of time falls below a threshold, etc.

For example, the prediction may indicate a likely future operating behavior of the deployment during the future period of time. The prediction may be analyzed to ascertain whether the deployment may lack sufficient computing resources to perform its functionality.

If it is determined that the prediction indicates a negative impact on the deployment, the method may proceed to step 210. If it is determined that the prediction does not indicate a negative impact on the deployment, the method may end following step 216. In other words, if negative impacts are indicated by the prediction, the system may perform additional analysis to ascertain how best to mitigate the negative predictions and/or determine how much faith to place in the predicted negative impacts. In contrast, if no negative impacts are indicated by the prediction, the system may not take any action to manage the deployment.

In step 210, a confidence level estimation for the prediction is generated based on a variability of the second telemetry data from the telemetry data. In other words, the telemetry data used as the basis for the prediction is compared to the telemetry data used to generate the predictive model to obtain the confidence level estimation. The comparison may be used to ascertain whether the telemetry data is similar to that used as a basis for training or not. The level of dissimilarity may be used as the basis for the confidence level estimation.

As noted above, the accuracy of the predictions and prediction error estimates provided by the prediction model are likely to only be accurate across the domain of data used to train the prediction model. Consequently, dissimilar data used as input to the model is likely to result in the generation of inaccurate prediction error estimates.

Figure 3:
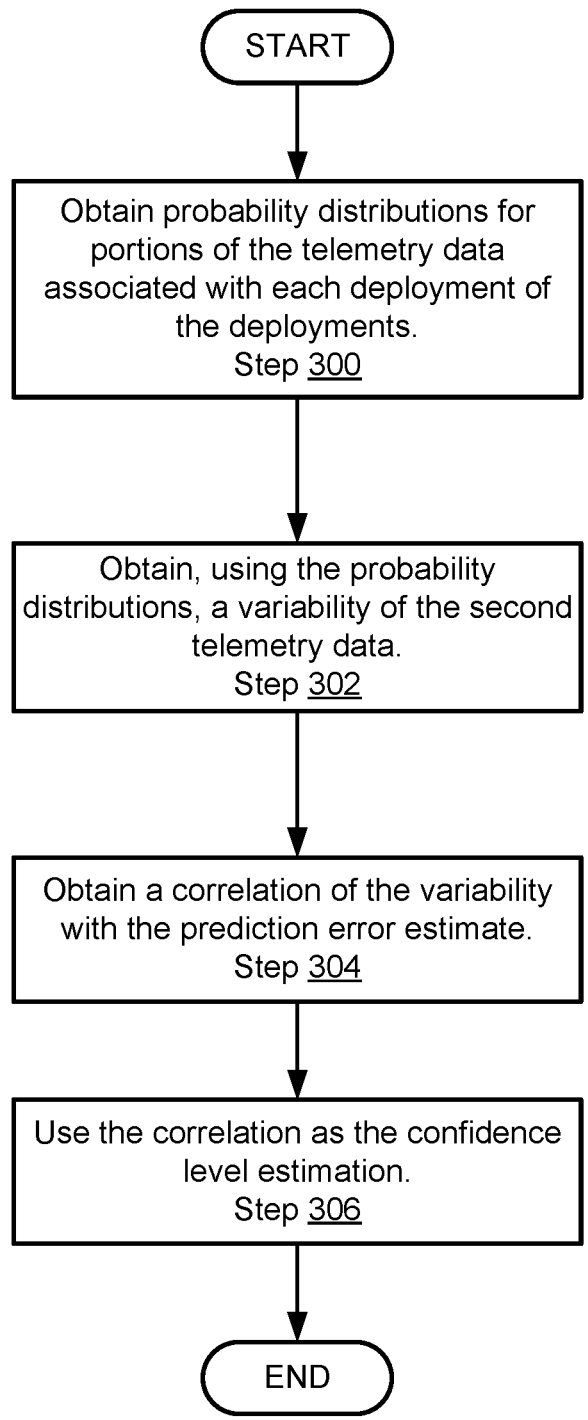
FIG. 3 shows a flowchart of a method of obtaining confidence level estimations of prediction error estimates in accordance with one or more embodiments of the invention.

In one or more embodiments of the invention, the confidence level estimation is generated using the method illustrated in FIG. 3. Other methods for generating the confidence level estimation may be used without departing from the invention.

In step 212, it is determined whether the confidence level estimation indicates that the prediction error estimate is accurate.

The confidence level estimation may have a numerical value indicating whether the prediction error estimate is accurate. For example, the confidence level estimation may be a number having a value between 0 and 1, 0 indicating that the variability of the second telemetry data being dissimilar to the prediction error estimate across the input domain of the prediction model. In other words, if the variability of the second telemetry data is similar to the prediction error estimate across the input domain of the prediction model, the prediction error estimate is determined as being inaccurate, because it is this variability in the telemetry data that is likely the source of the error rather than that of the prediction model.

If the value of the confidence level estimation is below a predetermined threshold, the prediction error estimate is determined as being accurate. If the value of the confidence level estimation is above a predetermined threshold, the prediction error estimate is determined as being inaccurate.

In one or more embodiments of the invention, the predetermined threshold is between 0 and 0.05. The predetermined threshold may be 0.1.

If it is determined that the prediction error is accurate, the method may proceed to step 216. If it is determined that the prediction error is inaccurate, the method may proceed to step 214.

In step 214, the prediction and/or the prediction error estimate is remediated.

The prediction and/or the prediction error estimate may be remediated by modifying the prediction model. For example, additional telemetry data may be used to retrain the prediction model. The retrained prediction model may be used to generate an updated prediction and/or the prediction error estimate as discussed with respect to steps 204-206. The updated prediction and/or prediction error estimate may then be subjected to steps 210 and 212.

The prediction and/or the prediction error estimate may be remediated by assigning a data analyst or other person to investigate the prediction and/or the prediction error estimate. The result of the investigation may be an updated prediction and/or prediction error estimate, as discussed above.

The prediction and/or the prediction error estimate may be remediated using other methods than those discussed above to obtain higher accuracy predictions and/or error estimates without departing from the invention.

In step 216, an action set, based on the prediction, prediction error estimate, and/or the confidence level estimation, is performed to reduce the negative impact indicated by the prediction on the deployment. As noted with respect to FIG. 1.3, the deployment manager may use the tuple (i.e., prediction, prediction error estimate, and the confidence level estimation as a key to identify the action set.

The action set may include one or more actions to be performed by the system of FIG. 1.1. Performing the actions set may result in a modification of the operation of the deployment for which the prediction was generated and/or other components of the system of FIG. 1.1. The modification may decrease the likelihood that the deployment was provide lower quality computer implemented services in the future.

For example, the action set may include a modification to the operation of the storage system utilized by the deployment. The modification may address, for example, an upcoming bottleneck in the storage system that would otherwise storage resource constrain the deployment in the future thereby reducing the quality of computer implemented services provided by the deployment.

The action set may include any number and/or type of actions. For example, the action set may include changes in the operation of the hardware components and/or software components of the deployment. The changes to the hardware components may include, for example, configuration changes, disabling/enabling hardware, etc. The changes to the software components may include, for example, suspending execution of one or more applications, resource utilization constraining one or more applications, modifying the execution time of one or more of the applications, reducing the number of users utilizing the computer implemented services provided by the deployment (e.g., terminating application sessions between the deployment and one or more clients, etc.), etc.

The method may end following step 216.

Using the method illustrated in FIG. 2, deployments may be managed based on their likely future operating behavior, likely errors included in the predicted operating behavior, and confidence levels in the error predictions. By doing so, the likely future operating behavior of the deployments may be analyzed while taking into account multiple sources of error in the predictions. Consequently, the management decisions with respect to the deployments are more likely to result in improved computer implemented services.

FIG. 3 shows a flowchart of a method in accordance with one or more embodiments of the invention. The method depicted in FIG. 3 may be used to obtain confidence level estimates in accordance with one or more embodiments of the invention. The method shown in FIG. 3 may be performed by, for example, a deployment manager (e.g., 110, FIG. 1.1). Other components of the system illustrated in FIG. 1.1 may perform all, or a portion, of the method of FIG. 3 without departing from the invention.

While FIG. 3 is illustrated as a series of steps, any of the steps may be omitted, performed in a different order, additional steps may be included, and/or any or all of the steps may be performed in a parallel and/or partially overlapping manner without departing from the invention.

In step 300, probability distributions for portions of the telemetry data associated with each deployment of the deployments are obtained.

The probability distributions may indicate the relative occurrence of the operating condition in each of the portions of the telemetry data in view of the relative occurrence of the operating condition in all of the telemetry data. Additionally, the probability distributions may be normalized based on the total number of occurrences of each operating condition.

For example, the telemetry data may include a number of operating conditions v. Each of these variables may be binarized into a fixed number of bins b. The bins may be used to construct a histogram H of dimensionality $b^v$. The number of bins for each operating condition b may not need to be the same.

Each bin in the histogram H may hold the count of the number of times the operating conditions of the corresponding bin occurred in the telemetry data. The histogram can be normalized by dividing all the counts by the sum of all counts, which results in the probability distribution.

In step 302, a variability of the second telemetry data is obtained using the probability distributions. In other words, the second telemetry data, used as input to the prediction model, is analyzed to identify how much it varies from the telemetry data used to train the prediction model.

To do so, a probability distribution of the second telemetry data is obtained. Using the probability distribution of the second telemetry data and the probability distribution of each portion of the portions of the telemetry data, the divergence of each of these probability distributions is obtained with respect to the aggregate probability distributions.

To do so, for each probability distribution, the respective probability distributions may be removed from the aggregate probability distributions and the divergence of the removed probability distribution relative to the remaining aggregate probability distributions may be calculated. The aforementioned divergence may be calculated using any method (e.g., Jensen-Shannon divergence) without departing from the invention.

In one or more embodiments of the invention, the divergence of the deployment may only be calculated with respect to similar deployments. To do so, only deployments having similar characteristics may be used when calculating the divergence of the telemetry data from the deployment with respect to the telemetry data of other deployments.

In some embodiments of the invention, the divergence of the deployment is judged against a hypothetic probability distribution for a hypothetical deployment having characteristics similar to that of the deployment. To generate the hypothetical probability distribution, the deployments are grouped into sets having the same characteristic (or a set of characteristics). For each of these groups, the divergence distribution for the telemetry data obtained from the deployments in each group is obtained. The resulting divergence distributions are each associated with the common characteristic upon which each group is based.

To obtain the variability of arrays with the same characteristics, a baseline divergence distribution is generated. The baseline divergence distribution is an ideal distribution that would be expected from deployments that provide homogeneous telemetry data upon which a machine learning model could be based.

The aforementioned process may be referred to as generating a homogeneous model divergence. The homogenous divergence model may be used to identify how much a deployment with the same characteristic diverges from diverges from the homogeneous model divergence. The result may be a single score for each group of deployments associated with corresponding characteristics that represents the variability of the deployment's telemetry data upon which the prediction is based.

In step 304, a correlation of the variability with the prediction error estimate is obtained. In other words, the variability is compared to the prediction error estimate to ascertain whether it is likely that the prediction error estimate is accurate.

If the variability is highly correlated with the prediction error estimate, then the prediction error estimate is likely inaccurate. If the variability is poorly correlated with the prediction error estimate, then the prediction error estimate is likely accurate.

Any method of correlating (e.g., the Pearson linear correlation coefficient) the variability to the prediction error estimate may be used without departing from the invention.

The resulting correlation may be a numeral value between 0 and 1. A value of 0 may represent poor correlation while a value of 1 may represent strong correlation.

In step 306, the correlation is used as the confidence level estimation. In other words, the numerical value representing the correlation may be used as the confidence level estimation.

The method may end following step 306.

Using the method illustrated in FIG. 3, a confidence level estimation of a prediction error estimate may be obtained. By ascertaining whether the prediction error estimate is likely to be accurate, better informed deployment management decisions may be made.

For example, if a prediction error estimate is high, it may indicate that the prediction should not be used for management purposes. However, if the prediction error estimate indicates that the prediction error estimate, itself, is inaccurate, the system may determine that the prediction should be taken into account when making management decisions. For example, the prediction may be remediated by, for example, using additional information to obtain an updated prediction which, in turn, may be used to make deployment management decisions.

In another example, if a prediction error estimate is low, it may indicate that the prediction should be used for management purposes. However, if the prediction error estimate indicates that the prediction error estimate, itself, is inaccurate, the system may determine that the prediction should not be taken into account when making management decisions. Rather, other metrics may be used to make deployment management decisions until a more accurate prediction is obtained.

To further clarify embodiments of the invention, a non-limiting example is provided in FIGS. 4.1-4.3. FIG. 4.1 shows a diagram of an example system similar to that of FIG. 1.1. FIGS. 4.2-4.3 illustrate interactions between components and/or actions performed by the components of the system of FIG. 4.1 over time. For the sake of brevity, only a limited number of components of the system of FIG. 1.1 are illustrated in each of FIGS. 4.1-4.3.

Example

Consider a scenario as illustrated in FIG. 4.1 in which a deployment manager (406) is managing three deployments (e.g., 400, 402, 404). At the point in time illustrated in FIG. 4.1, each of the deployments may be providing database services to clients. The databases of both deployments may include similar information and each of the deployments may be providing database services to similar numbers of client.

Turning to FIGS. 4.2-4.3, the aforementioned figures illustrate interactions and actions between components of the system of FIG. 4.1. In these figures, the relative occurrence in time of the interactions progresses from the top of each figure (i.e., earlier in time) to the bottom of each figure (i.e., later in time). FIG. 4.3 is a continuation of the diagram of FIG. 4.2. In other words, element 410 indicates the first interaction that occurs in time while element 430 indicates the last interaction that occurs.

To manage the deployments, the deployment manager (406) first obtains telemetry data (410, 412, 414) from the deployments (400, 402, 404). Using the telemetry data, the deployment manager (406) generates a prediction model (416). The prediction model may be used to predict the future operation of the deployments based on their past operation.

After the prediction model is generated, the third deployment (404) begins primarily providing instant messaging communication services to other devices. Due to the change in the services provided by the third deployment (404), the usage patterns of persistent storage of the third deployment (404) changes greatly by requiring substantially more random reads. Additionally, the number of users of the services provided by the third deployment (404) begins to increase.

In contrast, the first deployment (400) and second deployment (402) continue to provide the database services to approximately the same number of users.

As part of its management of the deployments, the deployment manager (406) obtains second telemetry data (418) from the third deployment (404). The second telemetry data (418) includes markedly different characteristics from those of the previously provided telemetry data (414) due to the change in usage of the services provided by the third deployment (404).

After obtaining the second telemetry data (418), the deployment manager (406) generates prediction and prediction error estimates (420) for the prediction using the prediction model and the second telemetry data (418). Unfortunately, the prediction indicates that the third deployment (404) will lack sufficient storage resources for providing its instant messaging services in the future. The prediction error estimate indicates that the prediction is likely to be accurate.

In response to identifying the negative impact on the third deployment (404) as indicated by the prediction, the deployment manager (406) calculates a variability of the second telemetry data with respect to the telemetry data (410, 412, 414) used to train the prediction model. The variability is highly correlated with the prediction error estimate indicating that the prediction error estimate is likely to be inaccurate.

In response to determining that the prediction error estimate is likely to be inaccurate, the deployment manager (406) remediates the prediction to obtain an updated prediction. Specifically, the deployment manager (406) requests that a data analyst reviews the prediction to ascertain whether it is likely to be accurate.

The analyst identifies that, due to the change in services provided by the third deployment (404), that the prediction is likely to be inaccurate. The analyst revises the prediction to indicate that the third deployment (404) will likely be able to provide its instant message services in the future if the database software hosted by the third deployment is removed.

Using the updated prediction, namely that the services may be successfully provided with changes to the third deployment, the deployment manager (406) identifies an action set using the updated prediction. The action set includes removing the data base software from the third deployment (404) which would reduce the number of services being provided by the third deployment (404).

Using the action set, the deployment manager (406) provides a deployment action (428) to the third deployment. The deployment action specifies that the database software hosted by the third deployment is to be removed.

In response to obtaining the deployment action, the third deployment (404) updates the operation of the third deployment using the deployment action (430). Specifically, the third deployment (404) removes the database software.

End of Example

Any of the components of FIG. 1.1 may be implemented using distributed computing devices. As used herein, a distributed computing device refers to functionality provided by a logical device that utilizes the computing resources of one or more separate and/or distinct computing devices.

Figure 5:
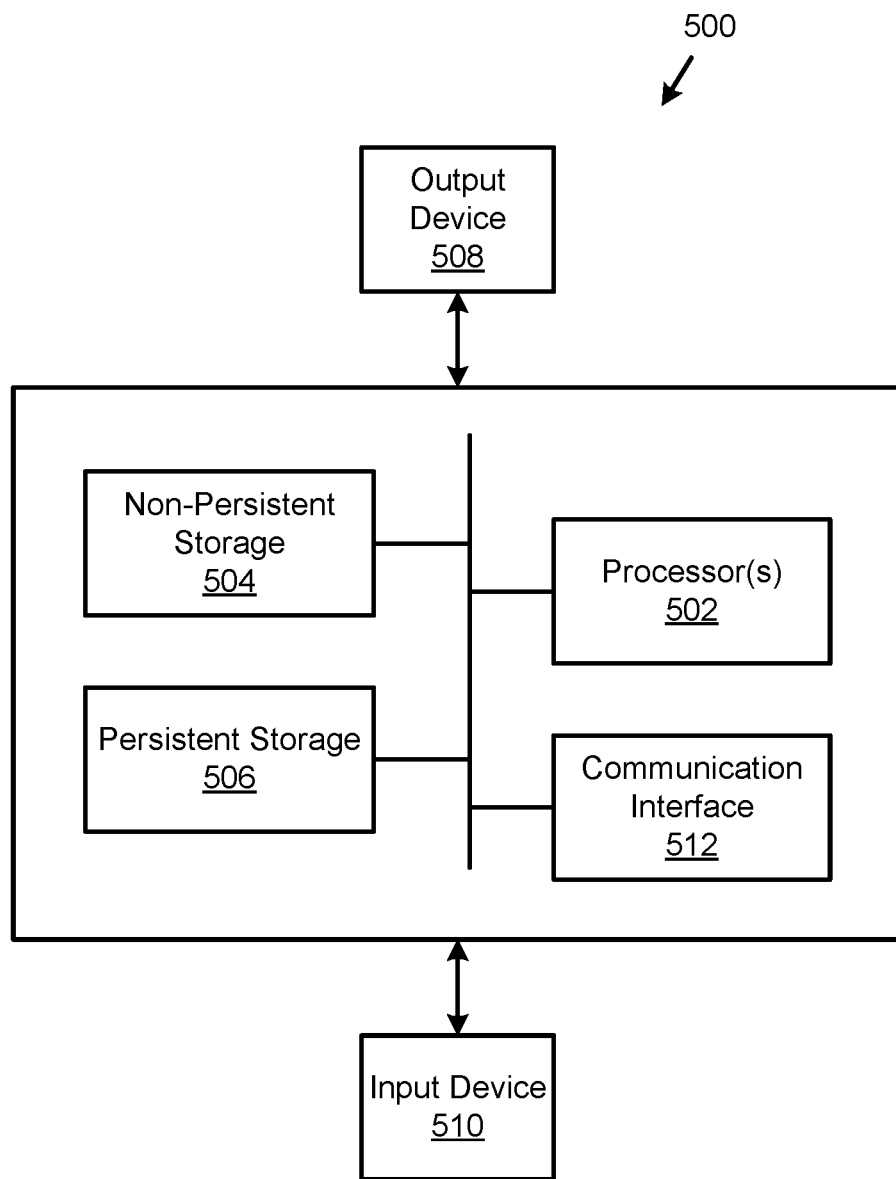
FIG. 5 shows a diagram of a computing device in accordance with one or more embodiments of the invention.

As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

Embodiments of the invention may provide a method and system for managing deployments by predicting their future operating conditions. To do so, the system may generate predictions, prediction error estimates, and confidence level estimations of the prediction error estimates. By doing so, the system may be its management decisions, in part, on whether the prediction error estimates are accurate. By doing so, the system may take into account the error that may be present in the prediction error estimates. Consequently, the management decisions made by the system may be more likely to positively contribute to the computing services provided by the system.

Thus, embodiments of the invention may address the problem of limited computational resources in a distributed system. Specifically, embodiments of the invention may improve the use of the limited computational resources by marshaling them more effectively by taking into account a larger number of potential sources of error used in predicting the future operating behavior of the system.

The problems discussed above should be understood as being examples of problems solved by embodiments of the invention disclosed herein and the invention should not be limited to solving the same/similar problems. The disclosed invention is broadly applicable to address a range of problems beyond those discussed herein.

One or more embodiments of the invention may be implemented using instructions executed by one or more processors of the data management device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A deployment manager, comprising:
    storage for storing a prediction model based on telemetry data from deployments; and
    a prediction manager programmed to:
        generate, using the prediction model and second telemetry data obtained from a deployment of the deployments:
            a prediction, and
            a prediction error estimate;

in response to a determination that the prediction indicates a negative impact on the deployment:
   generate a confidence estimation for the prediction based on a variability of the second telemetry data from the telemetry data;
   in response to a second determination that the confidence estimation indicates that the prediction error estimate is inaccurate:
      remediate the prediction based on the variability to obtain an updated prediction; and
      perform an action set, based on the updated prediction, to reduce an impact of the negative impact on the deployment.

2. The deployment manager of claim 1, wherein the prediction manager is further programmed to:
in response to a third determination that a second prediction indicates a second negative impact on a second deployment of the deployments:
   generate a second confidence estimation for the second prediction based on a variability of third telemetry data, from the second deployment, from the telemetry data;
   in response to a fourth determination that a second confidence estimation, associated with the second prediction, indicates that the second prediction error estimate is inaccurate:
      perform a second action set, based on the second prediction, to reduce an impact of the second negative impact on the second deployment.

3. The deployment manager of claim 1, wherein generating the confidence estimation comprises:
obtaining probability distributions for portions of the telemetry data associated with each deployment of the deployments.

4. The deployment manager of claim 3, wherein generating the confidence estimation further comprises:
obtaining, using the probability distributions, the variability.

5. The deployment manager of claim 4, wherein generating the confidence estimation further comprises:
obtaining a correlation of the variability with the prediction error estimate.

6. The deployment manager of claim 5, wherein the confidence estimation is based on the correlation.

7. The deployment manager of claim 1, wherein the action set comprises:
modifying an operation of the deployment based on the prediction.

8. A method for generating predictions using a prediction model based on telemetry data from deployments, comprising:
generating, using the prediction model and second telemetry data obtained from a deployment of the deployments:
   a prediction, and
   a prediction error estimate;
in response to a determination that the prediction indicates a negative impact on the deployment:
   generating a confidence estimation for the prediction based on a variability of the second telemetry data from the telemetry data;
   in response to a second determination that the confidence estimation indicates that the prediction error estimate is inaccurate:
      remediating the prediction based on the variability to obtain an updated prediction; and
      performing an action set, based on the updated prediction, to reduce an impact of the negative impact on the deployment.

9. The method of claim 8, further comprising:
in response to a third determination that a second prediction indicates a second negative impact on a second deployment of the deployments:
   generating a second confidence estimation for the second prediction based on a variability of third telemetry data, from the second deployment, from the telemetry data;
   in response to a fourth determination that a second confidence estimation, associated with the second prediction, indicates that the second prediction error estimate is inaccurate:
      performing a second action set, based on the second prediction, to reduce an impact of the second negative impact on the second deployment.

10. The method of claim 8, wherein generating the confidence estimation comprises:
obtaining probability distributions for portions of the telemetry data associated with each deployment of the deployments.

11. The method of claim 10, wherein generating the confidence estimation further comprises:
obtaining, using the probability distributions, the variability.

12. The method of claim 11, wherein generating the confidence estimation further comprises:
obtaining a correlation of the variability with the prediction error estimate.

13. The method of claim 12, wherein the confidence estimation is based on the correlation.

14. The method of claim 8, wherein the action set comprises:
modifying an operation of the deployment based on the prediction.

15. A non-transitory computer readable medium comprising computer readable program code, which when executed by a computer processor enables the computer processor to perform a method for generating predictions using a prediction model based on telemetry data from deployments, the method comprising:
generating, using the prediction model and second telemetry data obtained from a deployment of the deployments:
   a prediction, and
   a prediction error estimate;
in response to a determination that the prediction indicates a negative impact on the deployment:
   generating a confidence estimation for the prediction based on a variability of the second telemetry data from the telemetry data;
   in response to a second determination that the confidence estimation indicates that the prediction error estimate is inaccurate:
      remediating the prediction based on the variability to obtain an updated prediction; and
      performing an action set, based on the updated prediction, to reduce an impact of the negative impact on the deployment.

16. The non-transitory computer readable medium of claim 15, wherein the method further comprises:
in response to a third determination that a second prediction indicates a second negative impact on a second deployment of the deployments:

generating a second confidence estimation for the second prediction based on a variability of third telemetry data, from the second deployment, from the telemetry data;

in response to a fourth determination that a second confidence estimation, associated with the second prediction, indicates that the second prediction error estimate is inaccurate:

performing a second action set, based on the second prediction, to reduce an impact of the second negative impact on the second deployment.

17. The non-transitory computer readable medium of claim 15, wherein generating the confidence estimation comprises:

obtaining probability distributions for portions of the telemetry data associated with each deployment of the deployments.

18. The non-transitory computer readable medium of claim 17, wherein generating the confidence estimation further comprises:

obtaining, using the probability distributions, the variability.

19. The non-transitory computer readable medium of claim 17, wherein generating the confidence estimation further comprises:

obtaining a correlation of the variability with the prediction error estimate.

20. The non-transitory computer readable medium of claim 19, wherein the confidence estimation is based on the correlation.

* * * * *